(12) United States Patent
Lombard et al.

(10) Patent No.: US 8,398,372 B2
(45) Date of Patent: Mar. 19, 2013

(54) METHOD FOR REDUCING THE VIBRATION LEVELS OF A PROPELLER OF A TURBINE ENGINE

(75) Inventors: Jean-Pierre Francois Lombard, Pamfou (FR); Jerome Talbotec, Combs la Ville (FR)

(73) Assignee: SNECMA, Paris (FR)

( * ) Notice: Subject to any disclaimer, the term of this patent is extended or adjusted under 35 U.S.C. 154(b) by 871 days.

(21) Appl. No.: 12/548,008

(22) Filed: Aug. 26, 2009

(65) Prior Publication Data

US 2010/0054918 A1    Mar. 4, 2010

(30) Foreign Application Priority Data

Aug. 27, 2008  (FR) ...................................... 08 55757

(51) Int. Cl.
*B63H 5/10*    (2006.01)
*B64C 11/48*   (2006.01)
*B64C 27/10*   (2006.01)

(52) U.S. Cl. .................................. 416/128; 416/DIG. 2
(58) Field of Classification Search .................. 416/128, 416/DIG. 2
See application file for complete search history.

(56) References Cited

U.S. PATENT DOCUMENTS

| | | | | |
|---|---|---|---|---|
| 5,993,161 A * | 11/1999 | Shapiro | ........................... | 416/203 |
| 6,299,410 B1 * | 10/2001 | Hilbert et al. | .................. | 416/145 |
| 7,029,227 B2 * | 4/2006 | Berthillier et al. | ................. | 415/1 |
| 7,191,161 B1 * | 3/2007 | Rai et al. | .......................... | 706/15 |
| 7,500,299 B2 * | 3/2009 | Dupeux et al. | .............. | 29/407.07 |
| 2008/0206058 A1 * | 8/2008 | Dupeux et al. | ................. | 416/203 |

FOREIGN PATENT DOCUMENTS

| | | |
|---|---|---|
| EP | 1 965 024 A1 | 9/2008 |
| FR | 2 824 597 | 11/2002 |
| GB | 2 254 661 A | 10/1992 |

OTHER PUBLICATIONS

U.S. Appl. No. 12/548,040, filed Aug. 26, 2009, Lombard, et al.

* cited by examiner

*Primary Examiner* — Nathaniel Wiehe
*Assistant Examiner* — Woody A Lee, Jr.
(74) *Attorney, Agent, or Firm* — Oblon, Spivak, McClelland, Maier & Neustadt, L.L.P.

(57) ABSTRACT

A method for reducing the vibration levels capable of occurring, in a turbine engine including at least one propeller and one coupling structure of the turbine engine, because of the turbulence of aerodynamic origin generated by the coupling structure on the propeller. The method includes: defining an initial configuration of the aerodynamic profiles, calculating the synchronous forced response on the propeller as a function of the force of harmonic excitation generated by the coupling structure expressed in the form of a linear function of the generalized aerodynamic force for the mode in question, and determining a tangential geometric offset value θ of the individual aerodynamic profiles for stacked sections of one of the propeller or of the coupling structure in order to reduce the term corresponding to the generalized aerodynamic force. The combination of the sections with the tangential offsets therefore defines a new configuration of the aerodynamic profiles.

9 Claims, 3 Drawing Sheets

METHOD FOR REDUCING THE VIBRATION LEVELS OF A PROPELLER OF A TURBINE ENGINE

The present invention relates to the field of turbine engines and its object is a method making it possible to reduce the vibrations on the aerodynamic profiles of a propeller sustaining a periodic excitation resulting from the turbulence in the flow of gas along the turbine engine, generated by an obstacle close to said propeller.

BACKGROUND OF THE INVENTION

A turbine engine such as a turboprop or an unducted turbofan known as a UDF for "unducted fan" comprises one or more propellers, a propeller consisting in a disk with airfoils mounted on a hub that can rotate about a shaft. A set of two propellers forms a corotating or contrarotating propfan depending on whether the two propellers rotate in the same direction or in opposite directions. One of the main sources of excitation of the airfoils originates from the wakes and the pressure fluctuations generated by the obstacles adjacent to the propeller.

The coupling structure, most frequently in the form of a mast, by which the engine is attached, upstream or downstream of the propeller depending on the architecture, to the aircraft, forms the main obstacle generating turbulence in the flow. The movement of the airfoils of the propeller in this turbulence creates a synchronous harmonic excitation of the speed of rotation of the propeller concerned and generates an instationary pressure field on the surface of the airfoils.

In the field of aviation turbine engines, the vanes or airfoils are particularly sensitive parts because they must satisfy, in terms of design, imperatives of aerodynamic and aeroacoustic performance and of mechanical strength in rotation, temperature and aerodynamic load. All these aspects mean that these structures are fairly highly loaded statically and that, because of the imperatives of service life, the vibrational amplitudes that they sustain must remain low. Moreover, the aeroelastic coupling, that is to say the coupling between the dynamics of the propellers and the fluid flow, is a condition of the vibrational stability of the structure.

Within the context of the design of a turbine engine, and because of the multidisciplinarity of those involved, the design process is iterative. The vibrational design is carried out in order to prevent the presence of critical resonances in the operating range of the machine. The assembly is validated at the end of the design cycle by an engine test in which the vibrational amplitudes are measured. High vibrational levels associated either with resonances or with vibrational instabilities sometimes occur. The fine-tuning of the disk concerned must then be repeated, which is particularly protracted and costly.

The object of the present invention is to control, as early as during the design or development phase of the machine, the vibrational response levels of the airfoils in a turbine-engine structure comprising at least one moveable propeller and one fixed obstacle formed by the coupling structure, traversed by air.

DESCRIPTION OF THE PRIOR ART

In patent FR 2824597 in the name of the applicant, a method for reducing the vibrations in a structure comprising a disk and fixed sources of turbulence was proposed, consisting in modifying the angular distribution of the sources so as to modify the excitation frequency spectrum, as seen by the disk, generated by the sources of turbulence.

SUMMARY OF THE INVENTION

An object of the invention is therefore the treatment of the vibrations generated therefore by the turbulence caused by the obstacle in the air flow on the propeller. In a particular case, it is aimed at the turbulence generated on the air by the wake of an obstacle such as a coupling structure or a mast; this turbulence produces vibrations on the propeller situated downstream.

The object of the present invention is not limited to controlling the vibrational levels in a configuration in which the elements concerned are adjacent; it is aimed at controlling vibrational responses on a propeller for turbulence having its origin upstream or downstream of the propeller.

A further object of the invention is the achievement of a method which makes it possible to take the corrective measures that are required as early as possible or as far upstream as possible in the process of designing and fine-tuning turbine-engine propellers.

According to the invention, the method for reducing the vibration levels capable of occurring, in a turbine engine comprising at least one propeller and one coupling structure, because of the turbulence of aerodynamic origin generated by the coupling structure on the propeller, is noteworthy in that it comprises the following steps during the design of the aerodynamic profiles of the propeller and of the coupling structure:

A—an initial configuration of said aerodynamic profiles is defined as a function of the expected performance of the turbine engine, with the individual aerodynamic profiles of p sections ($c_1, c_2, \ldots c_p$) stacked radially between the root and the tip of said airfoils and of the aerodynamic structure;

B—the synchronous forced response $y(\omega)$ on the propeller is calculated as a function of the force $f(\omega)$ of harmonic excitation generated by the coupling structure based on the relation $y(\omega)=F(^\tau y_\upsilon * f(\omega))$, where F is a linear function of the generalized aerodynamic force $^\tau y_\upsilon * f(\omega)$ for the fundamental mode of vibration $\upsilon$ in question;

C—a coefficient ($\alpha<1$) of reduction of the synchronous forced response $y(\omega)$ is defined;

D—for each of said p stacked sections ($c_1, c_2, \ldots c_p$) of one of the propeller or of the coupling structure, a tangential geometric offset value $\theta$ of the individual aerodynamic profile is determined in order to reduce the term corresponding to the generalized aerodynamic force associated with the fundamental mode of vibration $\upsilon |^\tau y * f(\omega)|$, the temporal phase shift $\phi$ of the excitation pressure $f(\omega)$ being linked to the tangential geometric offset by the relation $\theta=N_{excit}*\phi$ where $N_{excit}$ is the number of exciter sources; the combination of the p sections with the tangential offsets therefore defines a new configuration of the aerodynamic profile of said propeller or coupling structure;

E—the synchronous forced response $y'(\omega)$ on the propeller is calculated;

F—if $|y'(\omega)|>\alpha*|y(\omega)|$, the calculation at D is repeated with new tangential geometric offset values;

G—if $|y'(\omega)|<\alpha*|y(\omega)|$, the new configuration is applied to at least one portion of the aerodynamic profiles of said propeller or coupling structure.

More particularly, the invention allows the treatment of various cases:

the propeller is in the wake of the coupling structure;
the propeller is upstream of the coupling structure.

The invention is the result of the theoretical analysis of vibration phenomena. It is shown that the forced response y(ω), of a linear structure subjected to a harmonic excitation force f(ω), is associated with the latter by a relation which may be formulated with complex terms in the manner expressed below under the hypothesis of a unit norm of the Eigen vectors relative to the weight:

$$y(\omega) = F(^T y_v * f(\omega)) = \sum_{v=1}^{n} [y_v *^T y_v / (\omega_v^2 - \omega^2 + j * \omega * \beta_v)] * f(\omega) \quad (1)$$

where
the symbol Σ means that the forced response y(ω) is the sum of the forced responses of each of the fundamental modes of vibration υ to the pulsation ω. The forced response for a determined fundamental mode of vibration is given by the relation between square brackets. The sum takes account of all of the n fundamental modes of vibration υ taken into consideration and that have to be treated, that is to say from the fundamental mode of vibration υ=1 to the fundamental mode of vibration υ=n.
$y_v$ corresponds to the modal deflection of the mode υ under the hypothesis of a unit norm of the Eigen vectors relative to the weight,
$^T y_v$ corresponds to the transpose of the preceding vector,
$\omega_v$ corresponds to the pulsation of the fundamental mode of vibration υ,
$\omega_v$ corresponds to the pulsation of the excitation,
$j^2 = -1$,
$\beta_v$ corresponds to the generalized modal damping for the fundamental mode of vibration υ,
. . .
and f(ω) is the harmonic excitation force; itself in the form f*cos(ω*t+φ) where t is time and φ the temporal phase shift.

In the case of an excitation of aerodynamic origin applied to a propeller, the term $^T y_v * f(\omega)$ represents the generalized aerodynamic force for the fundamental mode of vibration υ.

The treatment of the vibration phenomena includes, as part of the invention, the implementation of the means making it possible to reduce the modulus |y(ω)|.

Although to minimize the modulus |y(ω)| of the forced response subjected to the excitation force f(ω) the aim is usually to increase the factor $\beta_v$ associated with the damping for the fundamental mode of vibration υ, the efforts, according to the present invention, have been applied to reducing the modulus of the term corresponding to the generalized aerodynamic force of each of the fundamental modes of vibration υ.

A procedure to arrive at this consists in modifying the axis of stacking of the aerodynamic profiles studied in the direction tangential to the axis of rotation. Geometrically, an aerodynamic profile is defined based on the individual profiles of each of the sections parallel with one another made between the root of the profile and its tip. The sections therefore form a stack along a curve that is designated the stacking axis. The profiles are determined aeromechanically.

The procedure began with the hypothesis that, for a determined section, a modification in the tangential direction leaves the moduli of the instationary pressures unchanged for low variations (as an example, of the order of one degree for a disk consisting of 150 sectors).

This therefore makes it possible to directly link the temporal phase φ of the pressures to the tangential difference θ relative to the stacking axis for each aerodynamic profile section. With the following relation, the equivalence between the temporal phase shift on the pressures and the geometric phase shift, that is to say the tangential movement to be applied to the aerodynamic profile $\phi = \theta * N_{excit}$, is established
Where
φ=temporal phase shift;
θ=geometric phase shift;
$N_{exct}$=number of exciter profiles.

BRIEF DESCRIPTION OF THE DRAWINGS

The procedure according to the invention is described in greater detail below with reference to the figures in which.

DESCRIPTION OF THE PREFERRED EMBODIMENTS

Figure 1:
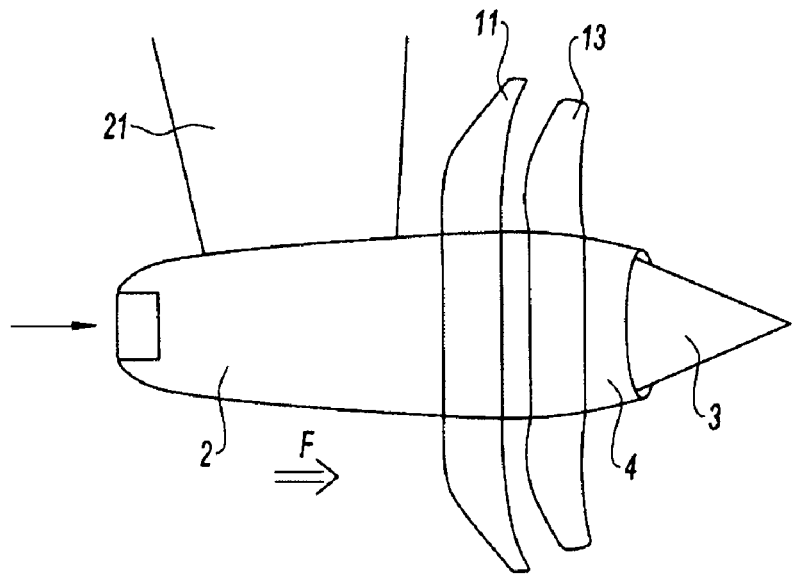
FIG. 1 represents schematically an unducted fan turboprop engine with a structure for coupling to an aircraft.

As can be seen in FIG. 1, a turbine engine structure 1 as in the subject of the invention comprises a gas generator such as a gas turbine engine 2 or a turbojet, driving one or two propellers, forming unducted fans called UDFs, in this instance two adjacent propellers 11 and 13. The two propellers 11 and 13 may be corotating or contrarotating. In the case of the arrangement of FIG. 1, the two propellers are behind the gas generator and are driven by rear turbines not shown. The engine comprises, in its downstream portion, a central cone 3 guiding the gases exhausted by the nozzle 4 downstream of the turbines driving the propellers.

The propellers are placed immediately downstream of the structure 21, in this instance a mast, for coupling the engine to the structure of the aircraft.

Figure 2:
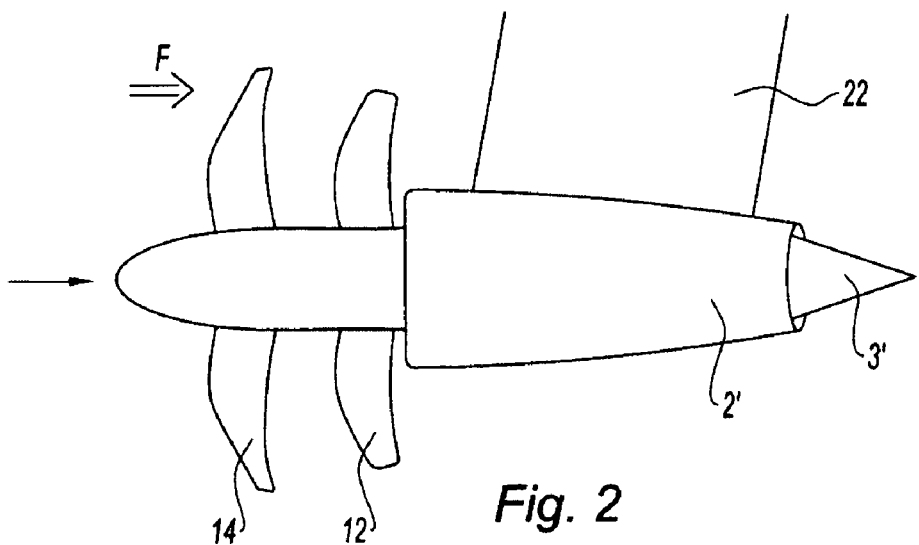
FIG. 2 represents a variant architecture of an engine and of coupling to the aircraft.

In the example of FIG. 2, the engine 2' comprises a propfan of propellers 12 and 14 placed at the front and driven by a reduction gear train not shown. The propellers are, in this instance, placed upstream of the structure 22 for coupling to the aircraft.

As has been reported above, the relative movement of a disk relative to an obstacle inside an axial gas flow, represented by the arrow F, is the source of turbulence. For example, with reference to FIG. 1, the propeller 11 sustains the influence of the fixed coupling structure 12 by being in its wake. This wake is the source of turbulence on the first moveable disk 11.

In FIG. 2, consideration is given to the propeller 12 which is in its position upstream of the fixed structure 22 and which sustains the exciter forces generated by this downstream structure 22.

Other situations are addressed by the present invention; it is not limited to the adjacent disks.

The aerodynamic profile of the airfoils of a propeller is usually determined by a plurality of sections made in the radial direction between the root and the tip. The airfoil is geometrically defined by the individual aerodynamic profile of a plurality of sections $c_1, c_2, c_3, \ldots c_p$ (p being of the order of 20) through tangential planes $p1, p2, \ldots p_p$ along this radial direction.

According to the invention, the modulus of the forced response $y(\omega)$ of the aerodynamic profiles of a propeller is reduced by seeking an adequate distribution of the pressure components in order to minimize the modulus of the generalized aerodynamic force associated with each of the fundamental modes of vibration $\upsilon$.

Specifically, as this results from the formula (1) reported above, the generalized aerodynamic force associated with a fundamental mode of vibration is a multiplying factor which appears in each of the terms of the sum $\Sigma$.

It should be noted that the excited aerodynamic profile is not necessarily modified. It is sufficient to act on one of the aerodynamic profiles either forming the source of excitation or being excited by the source of excitation.

Figure 5:
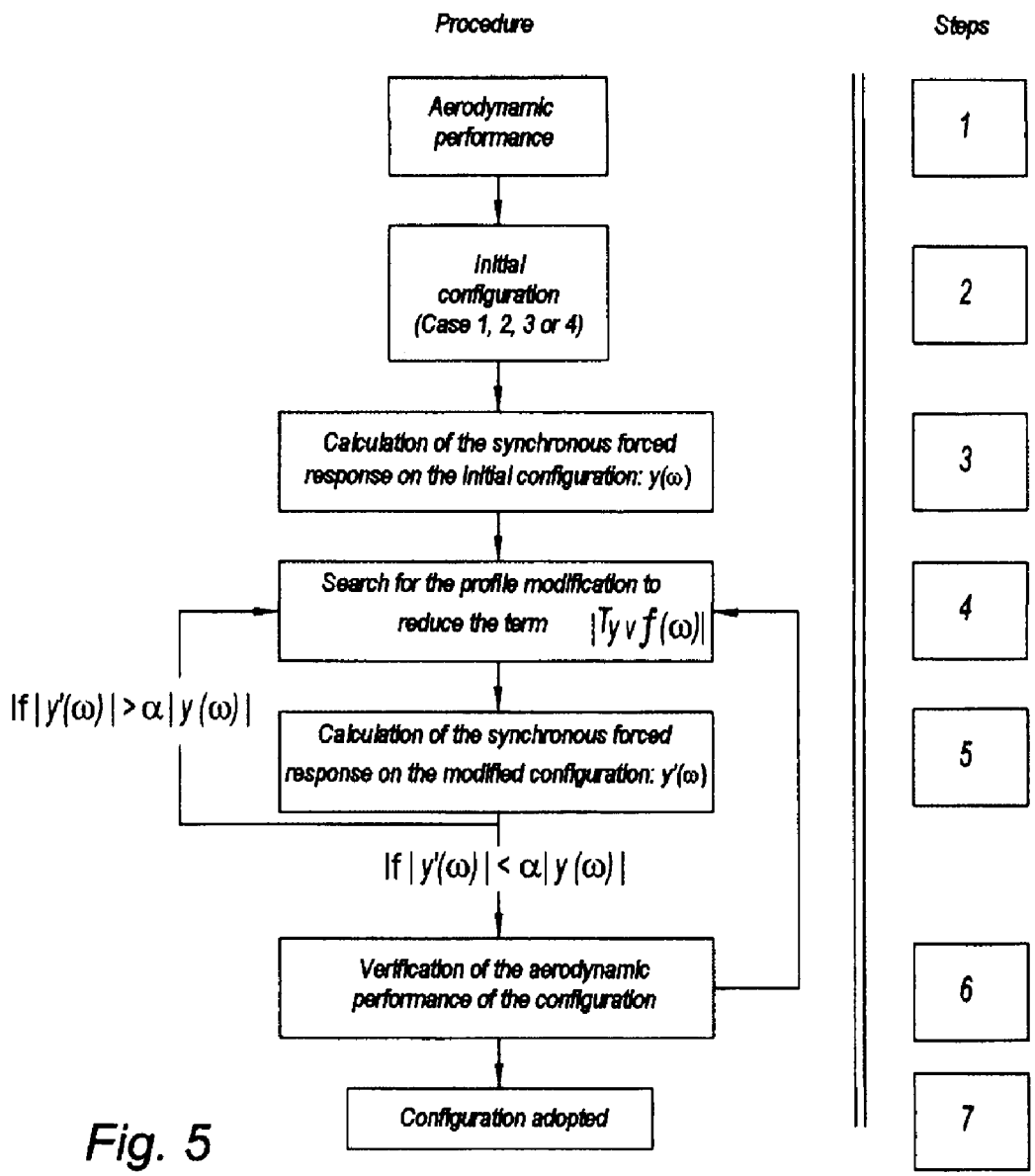
FIG. 5 is a flow chart of the various steps of the method according to the invention.

The procedure is developed below with respect to the flow diagram of FIG. 5.

The first two steps involve defining the specifications in terms of aerodynamic performance of the structure comprising the two vaned disks, then in calculating the initial configuration of the propeller and of the structure. This configuration comprises the profiles of the sections $c_1, \ldots c_p$ and of their stacking. The procedure is usually via aerodynamic iterations as is known to those skilled in the art.

Step 3: the aeroelastic forced response $y(\omega)$ is calculated on the vane having the initial configuration excited with a synchronous aerodynamic excitation $f(\omega)$:

The excitation is determined with the aid of instationary aerodynamic calculation.

An aeroelastic forced response calculation (defined by the relation (1)) is then made in order to determine the vibration levels.

The criticalness of these vibration levels is determined with the aid of a Haig diagram. This diagram, defined for a given material, makes it possible to define, for a given static stress, the acceptable dynamic stress in order to have an infinite vibrational service life.

If the predicted (or measured under test) vibration levels are considerable relative to experience, a target $\alpha^*|y(\omega)|$ (where $0<\alpha<1$) is defined in terms of maximum vibration level.

It is necessary to ensure that alpha is the smallest possible value taking account of the manufacturing tolerances.

Step 4: the procedure according to the invention is applied with the above maximum vibration level as the target.

The modulus of the aeroelastic forced response is minimized for a given mode knowing that it can be extended to any mode.

Figure 3:
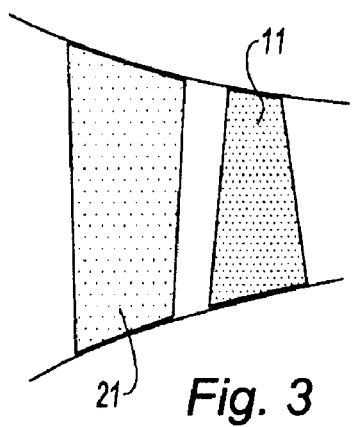
FIGS. 3 and 4 show the two cases that it is possible to treat according to the invention.
Figure 4:
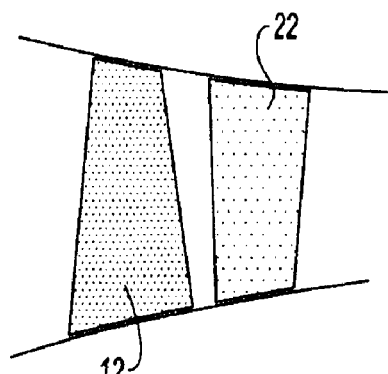
Figure 6:
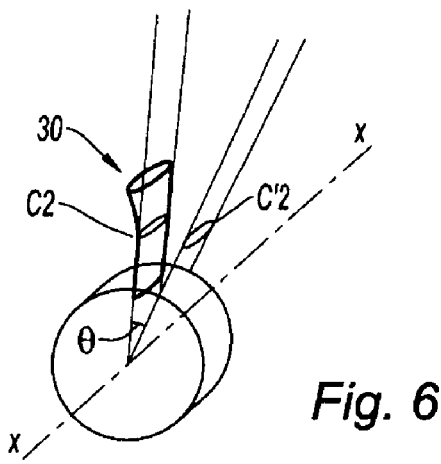
FIG. 6 shows the definition of the angle θ of tangential offset of a section defined relative to the axis of rotation.

The method consists in determining the geometric offset $\theta$, illustrated in FIG. 6, applied to the tangential stacking axis of an aerodynamic profile 30 so as to minimize the vibrational response due to the turbulence, such as the wake. A programming of the tangential offset to be applied to the aerodynamic profile to be modified is adopted. In FIG. 3, the calculation is made on the section c2. The value of $\theta$, which leads to angularly offsetting the section at c'2, is determined.

For this, techniques of the spline/poles or any discrete shape basis type or chosen to project the stacking law are used for example.

Any optimization method may be used. As an example, here are some conventional methods: the gradients method, the method called the "simulated annealing" method, the genetic method etc. (the magnitude to be minimized is the modulus $|^T y_\upsilon * f(\omega)|$ or the total of the moduli in the case of a multimode optimization).

Step 5: an aeroelastic forced response $y'(\omega)$ is calculated on the modified aerodynamic profile in order to verify that the target in terms of maximum vibration level is indeed achieved. If it is not, a new profile definition is defined.

Step 6: once the target is achieved, the user verifies that the aerodynamic performance is preserved by the modification of the stacking axis of the aerodynamic profile concerned.

Step 7: the new definition of the aerodynamic profile is adopted; it satisfies the aerodynamic criteria in terms of performance and the mechanical criteria in terms of vibration levels.

Figure 7:
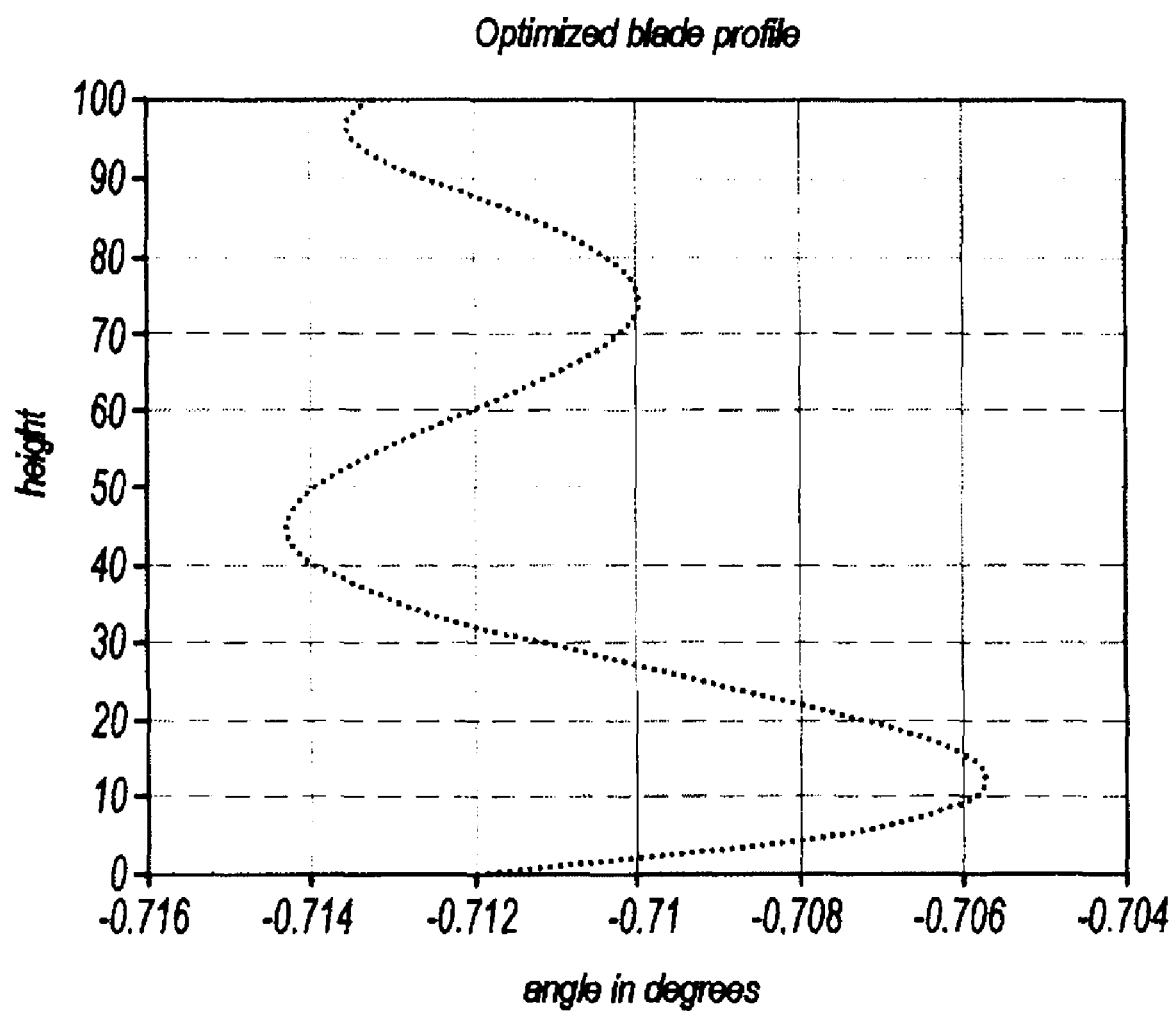
FIG. 7 is a graph illustrating an example for an aerodynamic profile of the values of the angle of tangential offset.

FIG. 7 shows an example of the appearance adopted by the aerodynamic profile after the method of the invention is applied. The individual aerodynamic profiles of the sections c1, c2 . . . are not modified aerodynamically. Each of them has sustained a tangential offset about the axis of the turbine engine. Each point on the graph of the optimized aerodynamic profile represents the value of the angle $\theta$ of the individual aerodynamic profile for each of the sections $c_1$ to $c_p$ over the whole height of the aerodynamic profile. It is noted that this value remains relatively low, less, according to this example, than 1 degree relative to the position corresponding to the initial configuration.

To the extent that the correction values are greater than the manufacturing tolerances of the aerodynamic profiles, the user has a means for reducing the vibration levels without adding weight or modifying the aerodynamic performance of the turbine engine and the technological interfaces of the vanes.

The invention claimed is:

1. A method for reducing vibration levels capable of occurring, in a turbine engine including at least one propeller and one coupling structure, because of turbulence of aerodynamic origin generated by the coupling structure on the propeller, the coupling structure coupling the engine to an aircraft, said method comprising the following steps:

a step A of defining an initial configuration of aerodynamic profiles as a function of an expected performance of the turbine engine, with individual aerodynamic profiles of p sections (c1, c2, . . . cp) stacked radially between a root and a tip of airfoils of the propeller and of the coupling structure;

a step B of calculating, using a computer, a synchronous forced response $y(\omega)$ on the propeller as a function of a harmonic excitation pressure force $f(\omega)$ generated by the coupling structure based on a relation $y(\omega)=F(^T y_\upsilon * f(\omega))$, where F is a linear function of a generalized aerodynamic force $^T y_\upsilon * f(\omega)$ for a fundamental mode of vibration $\upsilon$ in question;

a step C of defining a coefficient ($\alpha<1$) of reduction of the synchronous forced response $y(\omega)$;

a step D of determining, using the computer, a tangential geometric offset value $\theta$ of the individual aerodynamic profile for each of said p stacked sections (c1, c2, . . . cp) of one of the propeller or the coupling structure in order to reduce a term corresponding to the generalized aerodynamic force associated with the fundamental mode of vibration $\upsilon|^T y * f(\omega)|$, a temporal phase shift $\phi$ of the harmonic excitation pressure force $f(\omega)$ being linked to the tangential geometric offset by a relation $\theta=N_{excit}*\phi$, where $N_{excit}$ is a number of exciter sources, such that a combination of the p sections with the tangential offsets defines a new configuration of the aerodynamic profile of said propeller or coupling structure;

a step E of calculating, using the computer, a synchronous forced response $y'(\omega)$ on the propeller;

a step F of repeating, if $|y'(\omega)|>\alpha*|y(\omega)|$, the step D using new tangential geometric offset values;

a step G of applying, if $|y'(\omega)|<\alpha*|y(\omega)|$, the new configuration to at least one portion of the aerodynamic profiles of said propeller or coupling structure.

2. The method as claimed in claim 1, wherein $$y(\omega) = F(^T y_\upsilon * f(\omega)) = \sum_{\upsilon=1}^{n} [y_\upsilon *^T y_\upsilon * 1/(\omega_\upsilon^2 - \omega^2 + j*\omega*\beta_\upsilon)] * f(\omega) \quad (1)$$

where
- the symbol $\Sigma$ means that the synchronous forced response $y(\omega)$ is a sum of forced responses of each fundamental mode of vibration $\upsilon$ to a pulsation $\omega$,
- $y_\upsilon$ corresponds to modal deflection of a mode $\upsilon$ under a hypothesis of a unit norm of Eigen vectors relative to a weight,
- $^T y_\upsilon$ corresponds to a transpose of a preceding vector,
- $\omega_\upsilon$ corresponds to pulsation associated with the mode $\upsilon$,
- $\omega$ corresponds to the pulsation of excitation,
- $j^2=-1$,
- $\beta_\upsilon$ corresponds to a generalized modal damping for a mode, and
- $f(\omega)$ is the harmonic excitation force in a form of $f*\cos(\omega*t+\phi)$, where t is time and $\phi$ the temporal phase shift.

3. The method as claimed in claim 2 wherein the propeller is in a wake of the coupling structure.

4. The method as claimed in claim 2 wherein the propeller is upstream of the coupling structure.

5. The method as claimed in claim 2 wherein said propeller is any one of a set of two propellers forming a propfan, the propfan being corotating or contrarotating.

6. The method as claimed in claim 1 wherein the propeller is in a wake of the coupling structure.

7. The method as claimed in claim 1 wherein the propeller is upstream of the coupling structure.

8. The method as claimed in claim 1 wherein said propeller is any one of a set of two propellers forming a propfan, the propfan being corotating or contrarotating.

9. The method as claimed in claim 1 wherein the coupling structure is a mast.

* * * * *